Figure 1:
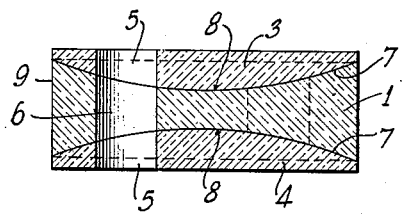

Nov. 30, 1937.　　　　S. L. TYLER　　　　2,100,366

VALVE

Filed Jan. 5, 1935

INVENTOR
STEPHEN L. TYLER
BY
Watson, Bristol, Johnson & Leavenworth
ATTORNEYS

Patented Nov. 30, 1937

2,100,366

UNITED STATES PATENT OFFICE 2,100,366

VALVE

Stephen Leslie Tyler, Garden City, N. Y.

Application January 5, 1935, Serial No. 501

6 Claims. (Cl. 251—84)

The invention relates to a valve structure adapted for inclusion in pipes and conduits serving as means for the conveyance of various materials, especially gases and liquids. More particularly it relates to a valve of the rotary type having a rotor and associated stators, of which contiguous surfaces are complementarily conformed, and it includes correlated improvements and discoveries whereby the manufacture and functioning of such valves are enhanced.

It is an object of the invention to provide a valve of such a structure that it will be self-centering and self-seating.

Another object of the invention is to provide valves in which the parts are interchangeable and readily replaceable.

A further object of the invention is to provide a rotary valve in which no packing is required, which may be lubricated with ease and which is adjustable to liquid pressure and to take up or compensate for changes due to operative wear.

Other objects of the invention are to provide a valve structure which may be readily, efficiently and economically manufactured on a commercial scale and from a variety of materials, and which may be assembled and dismantled with facility.

Other objects of the invention will in part be obvious and will in part appear hereinafter.

The invention accordingly comprises the features of construction, combination of elements, and arrangement of parts, which will be exemplified in the construction hereinafter set forth and the scope of the invention will be indicated in the claims.

In the practice of the invention a valve of the rotary type may be fabricated from a suitable material and includes in combination a rotor and associated stators, and in which contiguous surfaces are complementarily conformed. The stators which are the retaining elements may be and preferably are so constructed that they may be easily adapted to the conduit or pipe in connection with which the valve is to be used. The manner of attachment will depend upon the character of the conduit and may be by fusing to the ends of the pipes in the case of glass, by welding or by threading in the case of metals, or by a suitable clamping means in the case of ceramics, etc. The conformation of contiguous surfaces of the rotor and the stators may be in the form of a curved structure, as spherical, or arcuate.

A preferred form of rotary valve is one in which the surfaces of the rotor are concave and the contiguous surfaces of the stators convex. This structure lends itself to ready fabrication, assembling, positioning, maintenance, dismantling and replacement when necessary. The rotor and associated stators are each provided with a registering port, or it may be that each is provided with a plurality of registering ports. When more than one port is present in the structure it will be advantageous to arrange them symmetrically within the valve structure. The port or ports may be larger or smaller depending upon the character of the material being conveyed and size of the conduit or pipe, but such ports or ports should not be of a size which would hinder or prevent a complete shutting off of the flow of material through the line, or materially weaken the valve structure. These ports are arranged parallel with respect to the axis of the rotor and stators but eccentrically as to the axis of rotation of the rotor.

The positioning and holding of the rotor and associated stators in operative relation may be effected by a suitable means, such as engaging clamps, or by having the stators provided with lugs having openings therein and through which holding elements, as a bolt, could be passed. When assembled and forming part of a conveying line the valve may be easily opened and closed by rotating the rotor element. This rotation may be accomplished either by hand through a roughening of the outer extending surfaces of the rotor, or the rotor may be provided with suitable protuberances which may be gripped by the hand or a suitable wrench, or openings may be provided about the periphery of the rotor into which a bar or rod may be inserted. Further, the rotation of the rotor may be accomplished through a suitable gear train operated either manually or by power, and in addition the rotation force may be applied centrally instead of peripherally. Furthermore, the operation of the rotor may be facilitated by applying a suitable lubricant to the bearing surfaces, or by forming the rotor of a composition containing a lubricant, as for example, graphite.

For a fuller understanding of the nature and objects of the invention reference should be had to the following detailed description taken in connection with the accompanying drawing, in which:

Fig. 1 illustrates the rotor and associated stator elements of a valve constructed in accordance with the invention. This structure comprises in combination a rotor 1 with which there is associated the stators 3 and 4. The contiguous surfaces of the rotor and the stators are complementarily curved, the surfaces 7. 7 of the stators being convex, and the contiguous surfaces 8. 8 of the rotor concave. The stators are provided with ports 5. 5 and the rotor with a port 6. These ports are parallel to the axis of the assembled rotor and stators, and eccentric with respect to the axis of rotation. The ports 5. 5 in the stators and the port 6 in the rotor are positioned so that by rotation of the rotor 1 the port 6 may be brought into registration with the ports 5. 5 to permit passage of material therethrough and, upon further rotation, is moved out of registration so as to shut off the flow. The periphery 9 of the rotor may be roughened or otherwise desirably adapted to permit a firm gripping in order to effect rotation.

Figure 2:
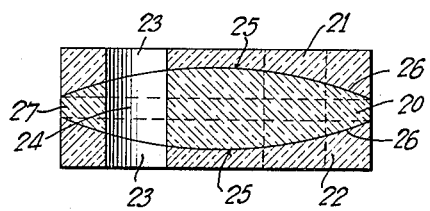

Fig. 2 depicts a valve structure which includes a rotor 20 and associated stators 21 and 22. The surfaces 26. 26 of the rotor are formed convex and the contiguous surfaces 25. 25 of the stators complementarily concave. The stators are provided with ports 23. 23 and the rotor with a port 24 which are positioned, and registration effected in the manner described in connection with Fig. 1. The peripheral surface 27 of the rotor 20 may be adapted to facilitate rotation as above described.

Figure 3:
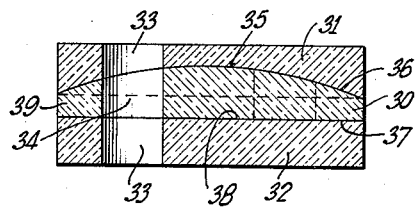

Fig. 3 is a modified form of rotary valve in which only two of the contiguous surfaces are complementarily formed, the others being merely plane surfaces. This structure contains a rotor 30 with associated stators 31 and 32. The surface 36 of the rotor and the contiguous surface 35 of the stator 31 are complementarily curved, the rotor surface being convex and the stator surface concave. The other rotor surface 37 and the surface 38 of the stator 32 are not complementarily conformed but are simply plane or flat surfaces. The stators are provided with ports 33. 33 and the rotor with a port 34, these ports serving by registration to permit flow and to shut off such flow, and the periphery 39 of the rotor may be adapted to facilitate rotation, all in the manner above mentioned.

Figure 4:
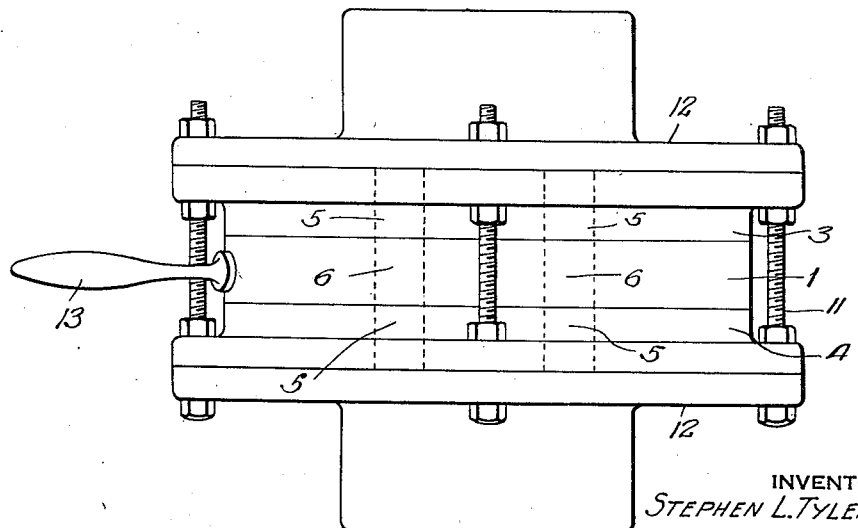

Fig. 4 depicts an assembled valve structure in which the rotor and associated stators are positioned in operative relation with respect to a conduit by means of flanged fittings and stud bolts. This is a usual manner of assembling a plurality of structural parts and this assembly includes a rotor 1 and associated stators 3 and 4. Movement of the rotor is facilitated by the handle 13 and it is provided with a plurality of ports 6. The associated stators have ports 5 which register with the ports 6 of the rotor, and the rotor and stators are in operative relation with respect to the flanged fittings 12, all being securely held by a plurality of stud bolts 11. It will be clear that the pressure upon the rotor may be adjusted by means of the bolts.

The rotary valve structures hereinabove described as illustrative embodiments of the invention all function by rotation of a center member or rotor, which is held in operative position between two stationary members or stators. These stators may be a part of the pipe or conduit in which the valve is placed or they may be separate and distinct members which are adapted readily to be joined into a pipe or conduit. Various forms of the valve members are shown, preferably the rotor is made with a double concave surface, whereas the contiguous surfaces of the stators are convex. In all cases there is a surface of the stators that is complementarily conformed to a contiguous surface present upon the rotor. While it is preferred that the surfaces on the opposite sides of the rotor be of like curvature, nevertheless this is not a necessary feature, and especially so if the surfaces of the rotor are spherical, in which case they may have either the same or different radii. Furthermore, one of the surfaces may be a plane or flat surface, but the other must be complementarily conformed with the contiguous surface of the stator. A particular feature of the valve structure, namely, its ability to center and to seat itself could not be accomplished if the surfaces of the rotor and associated stators were to be plane.

Fabrication of the valves may be from a variety of materials and will depend upon the substance or substances that are to pass therethrough. Materials that may be utilized include various metals, as iron, steels, copper, aluminum, alloys, ceramics, glass, carbon products as graphite, vulcanized rubber, vulcanized fibre, synthetic and natural resins, fused silica, and others. The manufacture of the valves may be carried out readily and effectively by the use of standard machinery, which is available for working of the various materials. Further, valves of many and various designs may include the rotary valve structure herein described, and also the rotor and/or stators may be reenforced if desirable and advisable in a suitable manner, as by means of a spider. It may be employed in the manfacture of valves in household plumbing, in pipe and conduit lines for conveying materials to various parts of a plant during the operation thereof, and bathroom and kitchen faucets may be designed to include the structure herein described. Likewise, apparatus used in chemical and physical testing laboratories may be designed to include this valve structure, and it may be adapted to enable flow in more than one way. The rotation of the rotor member may be made more easy by the application of a lubricant to the surfaces and this application may be either by dismantling and manual placement of the lubricant, or a suitable lubricating opening may be built into the structure. Furthermore, the rotor or the stator may contain as a part of their composition a lubricant such as graphite.

The rotary valve structure of the invention is characterized by many advantageous features, of which the following will be illustrative: self-centering and self-seating; no packing is necessary; the moving force may be applied either at the center or at the edge of the rotor; lubrication is easily effected by a casing filled with a lubricant, or by applying lubricant directly to the sealing surfaces, or the motor may be of graphite or a frictionless metal; the various parts are interchangeable and replaceable; it is adjustable to the pressure present in the line and also to take up the wear; a shearing action of the rotor at the ports prevents improper seating inasmuch as grit and other foreign substances are thereby prevented from entering between the sealing or contiguous surfaces; and it is non-freezing, that is the rotor does not tend to become set and difficult to move, but rather is freely and easily adjusted from one position to another but in the event that due to corrosion the rotor could not be moved, the pressure thereon may be readily relieved so that the rotor may then easily be turned.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. A rotary disc type valve comprising a rotor and associated stators, each provided with a registrable port, and in which a rotor surface is curved and the contiguous surface of the stator complementarily curved, said curved surfaces being the sole means for positioning the rotor, the flow through said valve being substantially parallel to the axis of rotation.

2. A rotary disc type valve comprising a rotor and associated stators, each provided with a registrable port, and in which the rotor surfaces are spherical and the contiguous surfaces of the stators complementarily conformed therewith, said spherical surfaces being the sole means for positioning the rotor, the flow through said valve being substantially parallel to the axis of rotation.

3. A rotary disc type valve comprising a rotor and associated stators, each provided with a registrable port, and in which the rotor surfaces are concave and the contiguous surfaces of the stators complementarily convex, said concave and convex surfaces being the sole means for positioning the rotor, the flow through said valve being substantially parallel to the axis of rotation.

4. A rotary disc type valve comprising a rotor and associated stators, each provided with a registrable port, and in which the rotor surfaces are spherically concave, the diameter of the sphere being many times the diameter of the rotor, and the contiguous surface of the stator spherically convex, said spherical surfaces being the sole means for positioning the rotor, the flow through said valve being substantially parallel to the axis of rotation.

5. A rotary disc type valve comprising a rotor and associated stators, each provided with a registrable port, means for positioning and holding said rotor and said stators in operative relation, and in which a rotor surface is curved and the contiguous surface of the stator complementarily conformed therewith, said curved surfaces being the sole means for positioning the rotor, the flow through said valve being substantially parallel to the axis of rotation.

6. A rotary disc type valve comprising a rotor and associated stators, each provided with a plurality of registrable ports, and in which the rotor surfaces are concave and the contiguous surfaces of the stators complementarily convex, said concave and convex surfaces being the sole means for positioning the rotor, the flow through said valve being substantially parallel to the axis of rotation.

STEPHEN LESLIE TYLER.